United States Patent Office 3,534,861
Patented Oct. 20, 1970

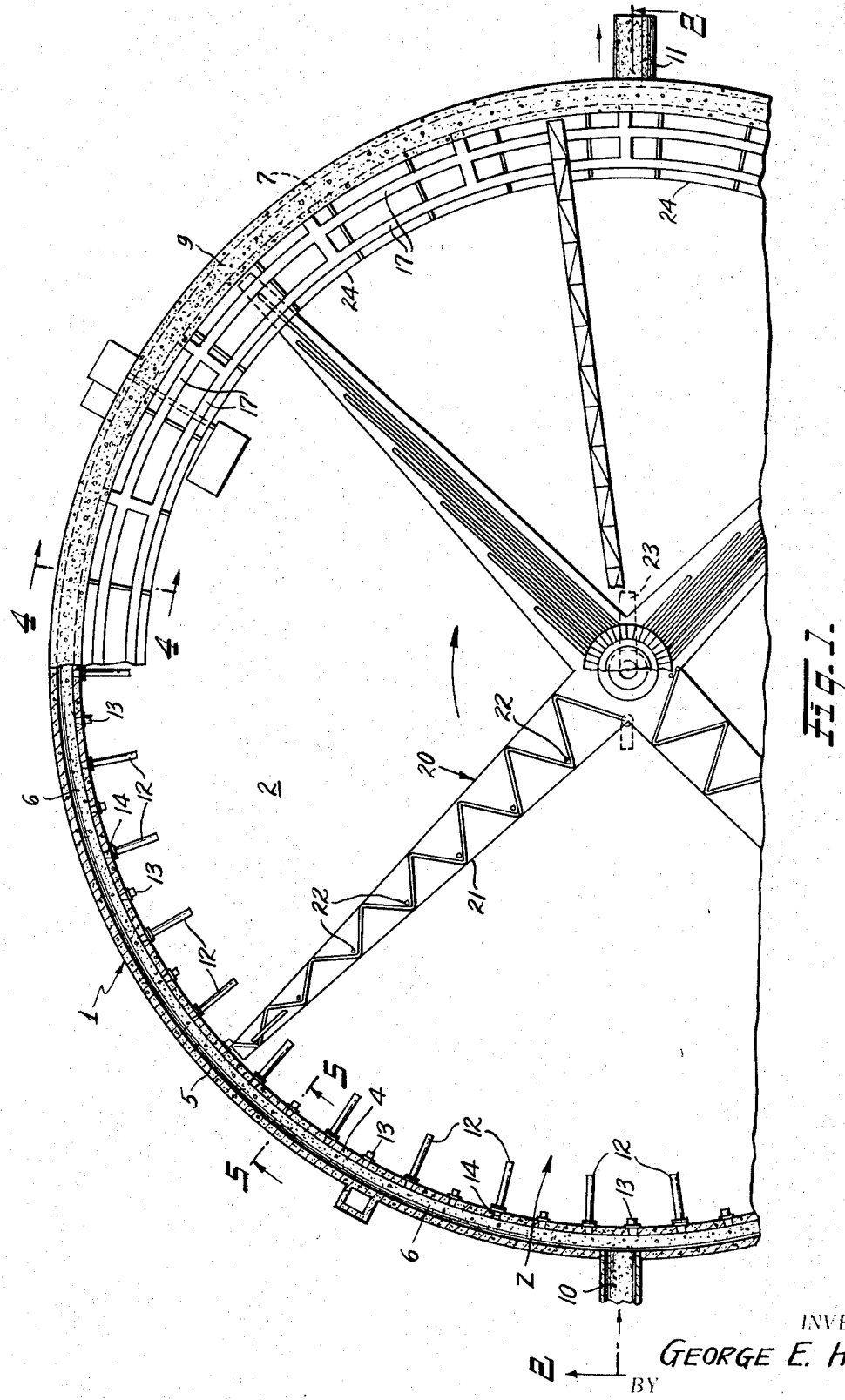

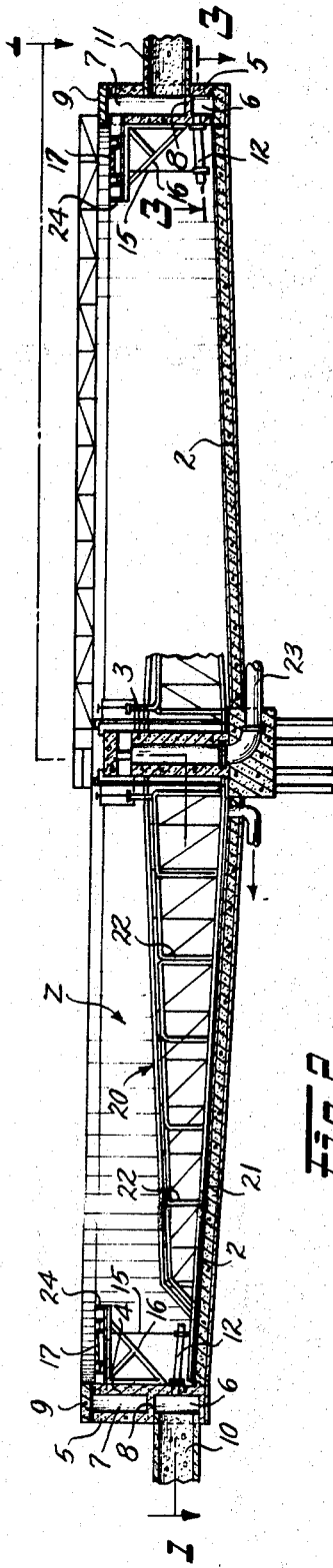
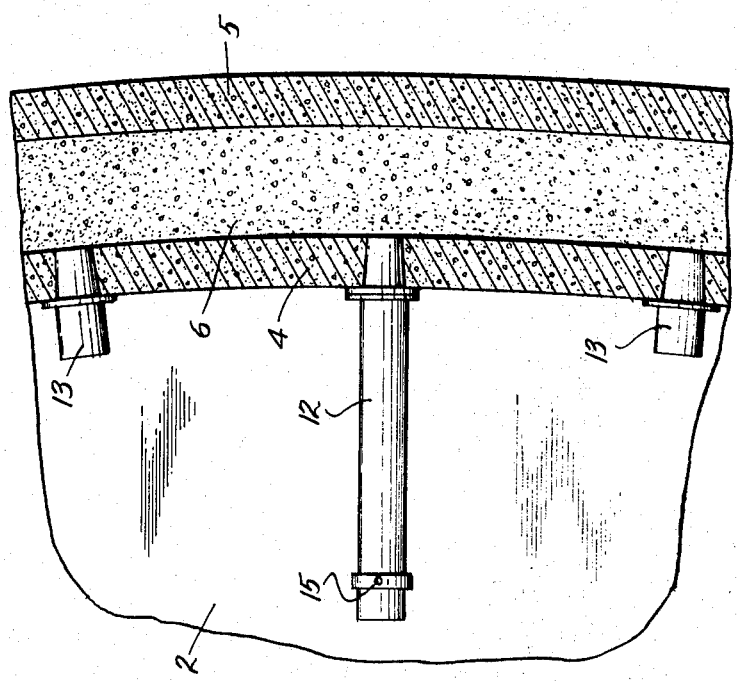

3,534,861
SETTLING TANKS
George E. Hubbell, Milford, Mich., assignor to The City of Detroit, Detroit, Mich., a municipal corporation
Filed Oct. 17, 1969, Ser. No. 867,153
Int. Cl. B01d *21/24*
U.S. Cl. 210—519                    7 Claims

ABSTRACT OF THE DISCLOSURE

A settling tank for wastewater, etc., including a continuous influent chamber which extends around the tank at the base of the wall structure, discharge of influent from the influent chamber into the tank being accomplished via alternately arranged longer and shorter discharge pipes to assure uniform distribution of the influent throughout the tank, with the influent flowing first along the bottom of the tank to assure rapid settling of solids.

---

This invention relates to settling tanks for solids-bearing liquids and, while more generally applicable, is especially useful in connection with tanks for wastewater clarification in activated sludge sewage treatment processes.

In sewage treatment, and in clarification of industrial wastes generally, gravitational settling tanks have long been used, and various forms of such tanks have achieved commercial acceptance. Prior-art workers have recognized that gravitational settling of solids from liquids can be accomplished most efficiently if settling occurs under circumstances such that particles need travel only a short distance in settling. However, providing for such short distance settling in applications in which very large quantities of liquid must be clarified has proved difficult, and there has been a continuing need for improvement.

It is accordingly a general object of this invention to devise a settling tank in which large volumes of liquid can be clarified quickly and uniformly.

Another object is to provide such a settling tank equipped with influent discharge means of such nature that a desirable circulating pattern is assured and areas of non-uniform flow, as well as short-circuit flow to the effluent weirs, are avoided.

Stated generally, settling tanks according to the invention include an influent chamber which extends completely around the tank in a location at the bottom of the tank wall, and a plurality of longer and shorter influent discharge ducts arranged in a series around the tank in such fashion as to conduct influent from the influent chamber and discharge the influent toward the center of the tank so that the discharged influent flows over the bottom of the tank inwardly toward the center, then upwardly, and then outwardly toward the periphery of the tank. The longer discharge ducts are inclined at a small angle toward the bottom of the tank, and the shorter discharge ducts discharge the influent at a greater angle toward the tank bottom. The combination of longer and shorter discharge ducts creates a circulation pattern such that all of the influent flows first near the bottom for rapid, short distance settling of solids, and also assures that distribution of the liquid will be uniform, without dead spots or short-circuting flow.

In order that the manner in which the foregoing and other objects are attained in accordance with the invention can be understood in detail, a particularly advantageous embodiment thereof is described with reference to the accompanying drawings, which form a part of the original disclosure of this application, and wherein:

FIG. 1 is a partial top plan view of a wastewater settling tank according to the invention;

FIG. 2 is a vertical sectional view taken generally on line 2—2, FIG. 1;

FIG. 3 is an enlarged, fragmentary, generally horizontal sectional view taken on line 3—3, FIG. 2;

Figure 4:
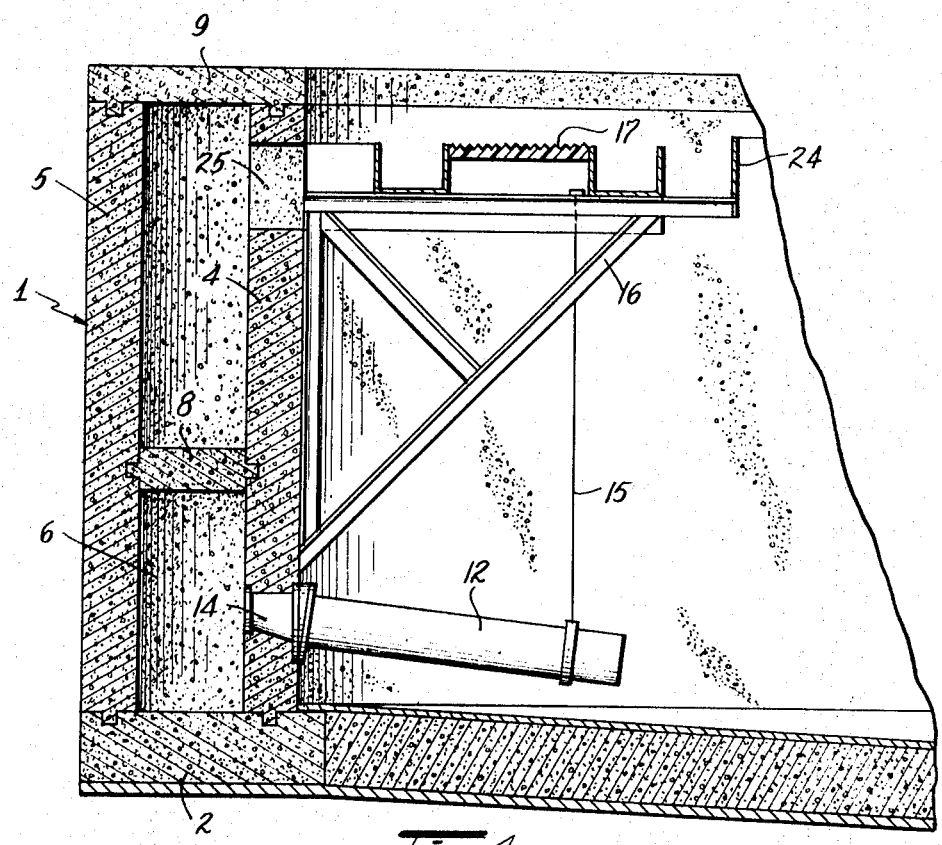
FIG. 4 is an enlarged, fragmentary, vertical sectional view taken generally on line 4—4, FIG. 1.
Figure 5:
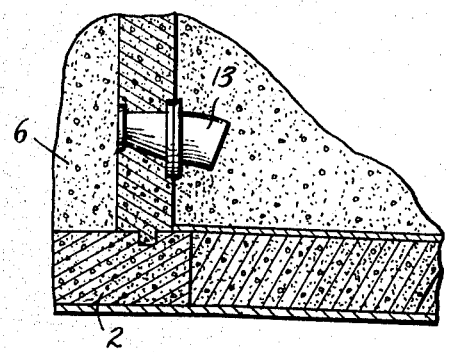
FIG. 5 is an enlarged, fragmentary, vertical sectional view taken on line 5—5, FIG. 1.

FIGS. 1–5 illustrate, as one advantageous embodiment of the invention, a circular sedimentation tank useful, for example, as the final settling tank in an activated sludge sewage disposal system. The tank comprises circularly extending outer wall means 1 and a bottom wall which slopes downwardly and inwardly to an upright central tower 3. Save for the space occupied by tower 3, the entire circular space defined by wall means 1 constitutes a settling zone Z.

Wall means 1 is constructed of reinforced concrete and includes an inner circular wall 4, and spaced outwardly therefrom and parallel thereto, an outer circular wall 5, walls 4 and 5 being cylindrical and concentric about a common vertical axis. The annular space between walls 4 and 5 is divided into an annular influent chamber 6 and an annular effluent chamber 7 by a partition 8 which extends continuously for the entire circular length of wall means 1. The bottom of the space between walls 4 and 5 is closed by bottom wall 2, which extends outwardly beyond wall 4. The top of the space between walls 4 and 5 is closed by a flat, horizontal wall 9.

The lower portions of walls 4 and 5 combine with wall 2 and partition 8 to define the influent chamber 6, while the upper portions of walls 4 and 5 combine with wall 9 and partition 8 to define the effluent chamber 7. A horizontal infeed pipe 10 communicates directly with influent chamber 6 via a circular port located in the portion of wall 5 below partition 8, the diameter of pipe 10 approximating the space between wall 2 and partition 8. In a location diametrically across the tank from infeed pipe 10, the portion of wall 5 above partition 8 is provided with a port communicating with an outflow pipe 11.

Influent is discharged from influent chamber 6 via a plurality of longer discharge pipes 12 and a plurality of shorter discharge pipes 13. In equally spaced locations along a horizontal line extending for the full length of wall 4 and located near bottom wall 2, wall 4 is provided with a plurality of ports each accommodating a tapered metal sleeve 14 arranged with its smaller end at the outer face of wall 4 and its larger end at the inner face of wall 4 and connected mechanically in any suitable fashion to the outer end of the corresponding one of discharge pipes 12, 13. Sleeves 14 are rigidly secured in wall 4, as by being put in place before the wall is poured, so that the sleeves are effectively embedded in the wall. The connections between the respective sleeves 14 and pipes 12, 13 are of such nature as to afford mechanical support for the discharge pipes and to provide a fluid-tight connection so that all of the liquid flowing through each sleeve 14 will necessarily be discharged through the corresponding pipes 12, 13.

Longer discharge pipes 12 are identical straight lengths of pipe which extend from wall 4 radially inwardly toward central tower 3, the length of pipes 12 being 0.04–0.15 times the radius of the inner face of wall 4. Typically, with wall 4 having a radius of 100 ft., pipes 12 can be on the order of 9 ft. long. Since pipes 12 are relatively long, it is advantageous to provide support for the inner ends thereof, and this is accomplished by support lines 15 each secured at one end to the frame 16 which supports effluent weirs 17 and at the other end to the inner end portion of the respective pipe 12. The connections between pipes 12 and sleeves 14, and the effective lengths of support lines 15, are such that the discharge pipes 12 slant downwardly and inwardly at a small angle, in the range of 4–8°, from horizontal.

Discharge pipes 13 are not only substantially shorter than pipes 12 but also are directed more sharply downwardly toward the bottom wall of the tank than are pipes 12. Advantageously, pipes 13 are in the form of elbows of such shape and disposition that the line of discharge of liquid from the inner ends thereof slants downwardly and inwardly at an angle of 20–25° from horizontal. Pipes 13 have an effective length of 0.1–0.25 times the length of the longer discharge pipes 12.

Discharge pipes 12 and 13 are arranged in alternation, with each of the shorter pipes 13 located between a different adjacent pair of the longer discharge pipes 12, as seen in FIGS. 1 and 3.

Infeed pipe 14 is directed along a diameter of circular wall means 1 and opens toward an area of wall 4 which does not include a discharge pipe 12 or 13, the flow from the infeed pipe thus dividing equally into two streams, one stream flowing along channel 6 in a clockwise direction (as viewed in FIG. 1) in one half of the chamber 6 and the other flowing through the other half in the opposite direction. Partition 8 slants downwardly from left to right (as viewed in FIG. 2), so that the cross-sectional area of channel 6 decreases in linear fashion. With influent supplied at a constant rate, and with discharge pipes 12, 13 being equally spaced around the tank and all having essentially the same flow capacity, the velocity of influent flow in chamber 6 is maintained substantially constant throughout the chamber.

The tank employs a rotary plow or rake structure 20 mounted on central tower 3 and powered by a suitable motor (not shown) so that the rake arms 21 continually traverse the entire settling zone Z. A plurality of pipes 22 are carried by arms 21 and communicate with the sludge withdrawal conduit 23, FIG. 2, for withdrawal of solids in usual fashion.

The weir structure supported by frame 16 includes a scum baffle 24 and weirs 17, the clarified effluent being delivered from the weirs to effluent chamber 7 via a plurality of openings 25, FIG. 4, provided in the upper portion of wall 4 and spaced around the tank.

When the tank is in operation, with solids-containing liquid influent supplied continuously at a predetermined substantially constant velocity via pipe 10, the influent is discharged continuously inwardly of the tank via discharge pipes 12 and 13, such discharge being simultaneous through all of the pipes 12 and 13 once chamber 6 has been filled. Since infeed pipe 10, chamber 6, and discharge pipes 12, 13 are all at substantially the same level, hydrostatic, head losses are minimized and the inflow rate in pipe 10 can be selected such that the influent is discharged from all of pipes 12 and 13 at a velocity which is sufficiently low to assure that settled solids on floor 2 will not be resuspended significantly, yet sufficiently high to provide the desired circulation pattern. The liquid discharged by pipes 12, 13 flows over the bottom of the tank, inwardly toward the center of the tank, then upwardly, and then outwardly toward the periphery of the tank. Since the fresh feed flows first in an area near the bottom of the tank, settling of larger and heavier solid particles occurs promptly, only a short vertical travel being required for settling. While fine particles tend to recirculate, rather than settling promptly, the circulation pattern promotes flocculation, with attendant further settling as the flocculated particles grow in size.

Use of the alternately arranged longer and shorter discharge pipes 12 and 13, discharging at their respectively shallower and steeper angles, provides uniform distribution of fresh influent throughout the tank, quiescent areas and areas of excessive flow being thus avoided. Also, the discharge pipe arrangement assures that essentially all of the fresh influent will travel first in generally horizontal flow through a path closely adjacent to the bottom of the tank, tendencies for short-circuit flow, from the points of influent discharge directly to the effluent weirs, being eliminated.

Since the influent is totally enclosed by the combination of pipe 10, chamber 6, and discharge pipes 12, 13, there is essentially no opportunity for scum to collect upstream from the tank, all scum being discharged into the tank for removal in conventional fashion. Further, since the effluent weirs are located at the periphery of the tank, the space at the top of the tank is kept open and uninterrupted, allowing use of economical skimming equipment.

Provision of the influent chamber in the lower portion of wall means 1 not only minimizes the hydrostatic head acting on the liquid in chamber 6 but also makes possible the provision of an economical construction in which the same concrete wall structures define both the influent and effluent chambers, and in which the effluent weirs can be mounted directly on the wall structure for maximum support.

While the illustrative embodiment of the invention has each short discharge pipe 13 located between a different adjacent pair of longer discharge pipes 12, it will be understood that other alternating combinations can be employed. Thus, for example, pairs of the shorter discharge pipes, can be alternated with pairs of longer discharge pipes, or the pipes can be arranged in alternate sets of three short pipes and three long pipes. Similarly, though a circular tank has been illustrated, and is advantageous, the invention can be applied to rectangular tanks and tanks of more complex plan configuration.

What is claimed is:

1. In a sedimentation tank, the combination of upright outer wall means extending in closed fashion to define a sedimentation zone;

effluent weir means extending along said wall adjacent the top thereof;

means located at the bottom portion of said wall means and defining an influent chamber which extends in continuous fashion from an inlet location throughout the length of said wall means and returning to said inlet location;

inlet pipe means communicating with said influent chamber at said inlet location; and influent discharge means for discharging solids-containing influent liquid from said influent chamber into said sedimentation zone, said influent discharge means comprising a first series of relatively longer discharge ducts each communicating with said influent chamber and extending inwardly away from said wall means, said relatively longer discharge ducts each being disposed to discharge influent from said influent chamber in a direction at least generally toward the center of said sedimentation zone and at a small angle downwardly toward the bottom of said sedimentation zone, and a second series of relatively shorter discharge ducts each communicating with said influent chamber and extending inwardly away from said wall means, said relatively shorter discharge ducts each being disposed to discharge influent from said influent chamber in a direction at least generally toward the center of said sedimentation zone and at a larger angle downwardly the bottom of said sedimentation zone;

the transverse cross-sectional area of said influent chamber decreasing progressively away from said inlet location in both directions, and said discharge ducts being uniformly spaced along said influent chamber throughout at least substantially the entire length thereof in such fashion that, when influent is supplied via said inlet pipe at a constant rate, influent flow velocity is substantially uniform throughout said influent chamber, said longer and shorter discharge ducts being alternately arranged, with shorter discharge ducts between longer discharge ducts, the cross-sectional areas of said discharge ducts, said influent chamber and said inlet pipe being such that, when influent is supplied at a given substantially constant rate via said inlet pipe, the influent discharged by said duct will flow generally near the bottom of said sedimentation zone and toward the center thereof, thence upwardly toward the surface of the liquid in said zone, and thence outwardly toward said wall means, the alternate arrangement of said longer and shorter discharge ducts serving to provide substantially uniform distribution of fresh influent throughout said sedimentation zone.

2. The combination defined in claim 1, wherein said wall means extends circularly.

3. The combination defined in claim 2, wherein each of said shorter discharge ducts is disposed between a different adjacent part of said longer discharge ducts.

4. The combination defined in claim 1, wherein said longer discharge ducts are straight pipes slanting from said wall means toward the bottom of said sedimentation zone at an angle of 4–8° from horizontal.

5. The combination defined in claim 1, wherein said effluent weir means is mounted on the upper portion of said wall means, said wall means extends circularly, said longer discharge ducts are straight pipes each lying in a plane which extends radially from the center of said zone, the combination further comprising support means depending from said effluent weir means and connected to said longer discharge ducts to support the same.

6. The combination defined in claim 1, wherein said longer discharge ducts are substantially straight pipes.

7. The combination defined in claim 1, wherein said wall means comprises an upright wall of substantial thickness, said means defining said influent chamber comprises an outer wall portion, a bottom wall portion and a top wall portion which cooperate with said upright wall to define said influent chamber, said longer and shorter discharge ducts are pipes secured to said upright wall and projecting therefrom;

said upright wall means having a plurality of ports equal in number of said discharge ducts and each communicating between the interior of said influent chamber and the entrance end of a different one of said ducts, said ports each being tapered and arranged with its smaller end at the interior of said influent chamber and its larger end at the entrance end of the corresponding discharge duct.

References Cited

UNITED STATES PATENTS

| | | | |
|---|---|---|---|
| 2,702,124 | 2/1955 | Stengel | 210—320 |
| 2,961,100 | 11/1960 | Katz et al. | 210—519 |
| 3,136,724 | 6/1964 | Lind et al | 210—519 |
| 3,221,889 | 12/1965 | Hirsch | 210—519 X |
| 3,228,530 | 1/1966 | Quast et al. | 210—519 X |
| 3,395,800 | 8/1968 | Kraus et al. | 210—519 X |

J. L. DE CESARE, Primary Examiner

U.S. Cl. X.R.

210—528

PO-1050
(5/69)

UNITED STATES PATENT OFFICE
CERTIFICATE OF CORRECTION

Patent No. 3,534,861  Dated October 20, 1970

Inventor(s) George E. Hubbell

It is certified that error appears in the above-identified patent and that said Letters Patent are hereby corrected as shown below:

Column 1, line 63, "short-circuting" should read --short-circuiting--.

Column 3, line 51 should read --same level, hydrostatic head losses are minimized and--.

Column 4, line 65, --toward-- should be inserted after "downwardly".

Column 6, line 14, "of" should read --to--.

SIGNED AND
SEALED
MAR 16 1971

MAR. 16,1971

(SEAL)
Attest:
Edward M. Fletcher, Jr.
Attesting Officer

WILLIAM E. SCHUYLER, JR.
Commissioner of Patents